US011419451B2

(12) United States Patent
Savino

(10) Patent No.: US 11,419,451 B2
(45) Date of Patent: Aug. 23, 2022

(54) APPARATUS AND METHOD FOR PRODUCING BEVERAGES FROM DRY INGREDIENTS

(71) Applicant: Plant Tap, LLC, North Salem, NY (US)

(72) Inventor: Joseph Camillo Savino, North Salem, NY (US)

(73) Assignee: Plant Tap, LLC, North Salem, NY (US)

( * ) Notice: Subject to any disclaimer, the term of this patent is extended or adjusted under 35 U.S.C. 154(b) by 0 days.

(21) Appl. No.: 15/671,121

(22) Filed: Aug. 7, 2017

(65) Prior Publication Data

US 2018/0035841 A1 Feb. 8, 2018

Related U.S. Application Data

(60) Provisional application No. 62/372,121, filed on Aug. 8, 2016.

(51) Int. Cl.
*A47J 31/60* (2006.01)
*A47J 31/40* (2006.01)
(Continued)

(52) U.S. Cl.
CPC .............. *A47J 31/605* (2013.01); *A23L 2/39* (2013.01); *A47J 31/401* (2013.01);
(Continued)

(58) Field of Classification Search
CPC .... A47J 31/40–41; A47J 31/46; A47J 31/605; B01F 3/1214; B01F 25/85; C11B 3/16
(Continued)

(56) References Cited

U.S. PATENT DOCUMENTS 2,614,738 A * 10/1952 Mills ....................... A47J 31/40
137/398
3,251,550 A * 5/1966 Muschelknautz ......... B01F 5/04
239/4
(Continued)

FOREIGN PATENT DOCUMENTS

CN 104782773 A 7/2006
CN 201044718 Y 4/2008
(Continued)

OTHER PUBLICATIONS

Nut Milk Wet Blending Machines, Aug. 15, 2016, https://www.alibaba.com/product-detail/nut-milk-wet-blending-machines_60465570199.html?spm=a2700.7724857.0.0.Pd0spa.

*Primary Examiner* — John J Norton
(74) *Attorney, Agent, or Firm* — Finnegan, Henderson, Farabow, Garrett & Dunner, L.L.P.

(57) ABSTRACT

An apparatus and method for mixing and milling dry ingredients with water to produce a homogenous beverage. The apparatus may include, for example, a water supply, a tubing system, a dry ingredient container, a splash-back prevention unit, and a mixer capable of emulsifying and homogenizing a slurry, which, in accordance with some embodiments, may include large ground course particles (such as nuts) and water. The apparatus may also include a pump configured to move the slurry and homogenized beverage through the tubing, and a motor, which, in accordance in some embodiments in accordance with the present disclosure, controls the mill.

10 Claims, 7 Drawing Sheets

(51) Int. Cl.

| | | |
|---|---|---|
| *C11B 3/16* | (2006.01) | |
| *C11B 1/10* | (2006.01) | |
| *A23L 2/39* | (2006.01) | |
| *B01F 23/53* | (2022.01) | |
| *B01F 23/50* | (2022.01) | |
| *B01F 25/85* | (2022.01) | |
| *B01F 27/271* | (2022.01) | |
| *B01F 27/272* | (2022.01) | |

(52) U.S. Cl.
CPC ............ *B01F 23/511* (2022.01); *B01F 23/53* (2022.01); *B01F 25/85* (2022.01); *B01F 27/2712* (2022.01); *B01F 27/2722* (2022.01); *B01F 27/2723* (2022.01); *C11B 1/10* (2013.01); *C11B 3/16* (2013.01); *A23V 2300/31* (2013.01); *B01F 23/581* (2022.01)

(58) Field of Classification Search
USPC ...................................................... 366/178.3
See application file for complete search history.

(56) References Cited

U.S. PATENT DOCUMENTS

| | | | | |
|---|---|---|---|---|
| 3,542,342 | A * | 11/1970 | Barron | E21B 21/062 366/178.1 |
| 4,595,131 | A * | 6/1986 | Ruskin | A47J 31/41 222/129.1 |
| 4,643,906 | A | 2/1987 | Pitz | |
| 4,744,992 | A | 5/1988 | Mitchell | |
| 4,800,097 | A | 1/1989 | Morris et al. | |
| 4,894,242 | A | 1/1990 | Mitchell | |
| 5,312,020 | A * | 5/1994 | Frei | G07F 13/065 222/129.1 |
| 5,918,768 | A * | 7/1999 | Ford | A47J 31/401 222/113 |
| 5,927,553 | A * | 7/1999 | Ford | A47J 31/401 222/113 |
| 5,975,357 | A * | 11/1999 | Topar | A47J 31/467 222/129.3 |
| 5,975,365 | A * | 11/1999 | Hsieh | G07F 13/065 222/129.3 |
| 6,153,247 | A | 11/2000 | Stoddard | |
| 6,419,120 | B1 * | 7/2002 | Bertone | A47J 31/401 222/129.4 |
| 6,485,773 | B1 | 11/2002 | Myers et al. | |
| 6,550,648 | B2 * | 4/2003 | Bardin | A47J 31/404 141/351 |
| 6,582,739 | B1 * | 6/2003 | Sawano | A23C 11/103 426/442 |
| 6,874,660 | B2 * | 4/2005 | Bertone | A47J 31/401 222/1 |
| 7,368,140 | B2 | 5/2008 | Tabata | |
| 8,333,301 | B2 * | 12/2012 | Doglioni Majer | A47J 31/401 141/104 |
| 8,695,483 | B2 * | 4/2014 | Koopman | A47J 31/404 99/289 R |
| 2006/0157602 | A1 * | 7/2006 | Wang | A47J 31/00 241/152.2 |
| 2007/0026128 | A1 | 2/2007 | Jarrett | |
| 2007/0128335 | A1 * | 6/2007 | Iwamoto | A23C 11/103 426/634 |
| 2015/0366254 | A1 | 12/2015 | Kesler et al. | |
| 2016/0338389 | A1 * | 11/2016 | Malone | A23C 3/031 |

FOREIGN PATENT DOCUMENTS

| | | |
|---|---|---|
| CN | 101861894 B | 8/2012 |
| CN | 102836667 A | 12/2012 |
| CN | 103636804 A | 3/2014 |
| CN | 104286185 A | 1/2015 |
| CN | 104304480 A | 1/2015 |
| CN | 104397182 A | 3/2015 |
| CN | 104489103 A | 4/2015 |
| CN | 104799281 A | 7/2015 |
| WO | WO 2013 078510 A1 | 6/2013 |

* cited by examiner

APPARATUS AND METHOD FOR PRODUCING BEVERAGES FROM DRY INGREDIENTS

CROSS-REFERENCE TO RELATED APPLICATION

The present application claims priority to U.S. Provisional Patent Application No. 62/372,121, filed Aug. 8, 2016, the content of which is incorporated by reference herein.

TECHNICAL FIELD

The present disclosure relates generally to an apparatus and method for producing beverages from dry ingredients, including fresh beverages made by milling or combining shelf-stable ingredients with water. Examples of beverages would include, but are not limited to, for example: meal replacement drinks, protein drinks, nut milks, and plant milks.

BACKGROUND

In this application, non-dairy, plant-based beverage products (often referred to as "milks") may be referenced generically as "plant based milks" to distinguish them from animal sourced (e.g., cow, goat, etc.) milk/dairy products, as well as from "lactose free milk" that is animal based but has been treated to remove lactose content. Plant-based beverages may be derived, for example, from soy or various nuts. Many retail plant-based products (e.g., almond-milk, cashew-milk, etc.), have numerous synthetic ingredients added to achieve a level of sterility for commercial distribution and retail sale. Additionally, retail products can have up to 20 ingredients such as gums, thickeners, vitamin packs, and preservatives that are added to this perishable liquid product to achieve an appealing taste, texture, color, etc., and to maintain that for a commercially acceptable shelf life.

A pure ("clean") plant-based beverage containing only a few ingredients (e.g., nuts and water), may be too perishable to be sold through a distribution chain, and as a result, retail shelves. Moreover, although the plant-based dry ingredients alone are not perishable and can be stored at room temperature, those ingredients can become highly perishable once commercially processed with water (hydrated). Even the preservative-laced milk products may not last over a week in a consumer's refrigerator, due to transit times in distribution and time the product sits on a retail shelf before purchase.

Dairy based milk occurs naturally in a water-based liquid state. So dairy-based dry ingredients can be mixed effectively with water, to some extent, just by stirring, agitating, or shaking the mixture. Plant-based beverages can be different because dry plant-based ingredients (e.g., nuts) can produce oils when ground into smaller particles. Put differently, because of their oil content, plant-based ingredients often cannot be mechanically ground into a dry powder that has a particle size fine enough to be suspended in water by simple mixing. For example, grinding nuts such as almonds, cashews, peanuts, etc., beyond a coarse ground state (e.g., the size of sea salt crystals) releases nut oil to create a stiff, oily paste-like "nut butter" where the fine-ground particles are suspended in oil. Most nut milk manufacturers mix nut butter with water and other ingredients such as preservatives and gums. Further, mixing a stiff oily paste with water, gums, and preservatives is very difficult without special equipment and skill.

At least some embodiments in accordance with the present disclosure describe a unique and more efficient way by which to mix dry, shelf-stable ingredients (including plant-based dry ingredients) with water to create beverages. The disclosed system and methods are specifically designed to account for the fact that thick, pasty, plant-based oils can form when plant-based ingredients are ground into course material. The disclosed system and methods can also be used to make fresh, clean, homogenous beverages without preservatives and gums.

SUMMARY

In accordance with at least some embodiments in accordance with the present disclosure, an apparatus is disclosed for milling/mixing dry ingredients with water to produce a homogenous beverage. The apparatus may include, for example, a water supply, a tubing system, a dry ingredient container, a splash-back prevention unit, and a mixer/mill capable of emulsifying a slurry into a homogenous mixture, wherein the slurry, in accordance with some embodiments, may include a large particle coarse ground ingredient (such as nuts) and water. The apparatus may also include a pump configured to move the slurry and homogenized liquid through the tubing system, and a motor, which, in accordance in some embodiments in the present disclosure, drives the mixer/mill.

In accordance with at least some embodiments, the dry ingredient container includes one of a disposable single serving or a re-fillable container.

In accordance with at least some embodiments, the apparatus may include a dry ingredient measuring feeder for measuring dry ingredient to be dispensed into water.

In accordance with at least some embodiments, the apparatus may include a water quantity measuring dispenser for measuring water to be mixed with the dry ingredient. In accordance with certain embodiments, the water supply is one of a re-fillable water reservoir or a water line hookup. The water in the slurry may be one of chilled or not chilled.

In accordance with at least some embodiments, the pump cycles sanitation fluid for cleaning. The pump may also cycle water for cleaning. Further, the splash-back prevention unit may stop water and slurry from splashing back into the dry ingredient container.

In accordance with at least some embodiments, the apparatus may also include a drive shaft for transmitting torque and rotation.

In accordance with at least some embodiments in accordance with the present disclosure, a method of combining dry ingredient with water to produce a homogenous beverage is also disclosed. The method may include, for example, the steps of retrieving water from a water supply, retrieving dry ingredient from a dry ingredient container, mixing the dry ingredient and water into a slurry, preventing splash back into the dry ingredient container with a splash back prevention unit, and emulsifying a slurry with a mixer/mill to create a homogenous liquid, whereby the slurry that is emulsified may include large coarse ground particles such as nuts and water. The method may also include moving slurry and homogenized beverage through a tubing system with a pump, and controlling the mixer/mill with a motor.

According to some additional embodiments, the dry ingredient container may include one of a disposable single serving or a re-fillable container. The method may also include measuring dry ingredient with a dry ingredient measuring feeder.

In accordance with at least some embodiments in accordance with the present disclosure, the method may further include measuring water with a water quantity measuring dispenser. In some embodiments, the water supply is one of a re-fillable water reservoir or a water line hookup. The water in the slurry is one of chilled or not chilled, in some other embodiments, and the pump may cycle sanitation fluid for cleaning. The pump may also cycle water for cleaning.

In accordance with at least some embodiments of the method in accordance with the present disclosure, the splash-back prevention unit stops water and/or slurry from splashing back into the dry ingredient container.

In various embodiments, the apparatus provides consumers with a convenient and affordable way to make a plant-based beverage with non-perishable ingredients. In accordance with one embodiment, the apparatus may product a single serving of nut milk.

The foregoing are just a few examples of the invention. Additional aspects of inventive concepts and embodiments of the invention are set forth in part in the description which follows, and in part will be apparent from the description, or may be learned by practice of the invention. The objects and advantages of the invention will be realized and attained by the elements and combinations pointed out in the appended claims.

The accompanying drawings, which are incorporated in and constitute a part of this specification, illustrate one embodiment and together with the description, serve to explain various alternative principles of the invention.

BRIEF DESCRIPTION OF THE DRAWINGS

Methods, and/or apparatuses described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION OF THE EMBODIMENTS

Reference will now be made in detail to the disclosed embodiments, examples of which are illustrated in the accompanying drawings. Wherever convenient, the same reference numbers will be used throughout the drawings to refer to the same or like parts.

Features and characteristics of the present disclosure, as well as methods of operation and functions of related elements of structure and the combination of parts and economies of manufacture, may become more apparent upon consideration of the following description with reference to the accompanying drawings, all of which form a part of this specification. It is to be understood, however, that the drawings are for the purpose of illustration and description only and are not intended as a definition of the limits of the invention. As used in the specification and in the claims, the singular form of "a", "an", and "the" include plural referents unless the context clearly dictates otherwise.

The embodiments described herein can apply to many fields. Descriptions and applications related to specific domains do not preclude the application of the described embodiments to other technologies or fields.

Figure 1A:
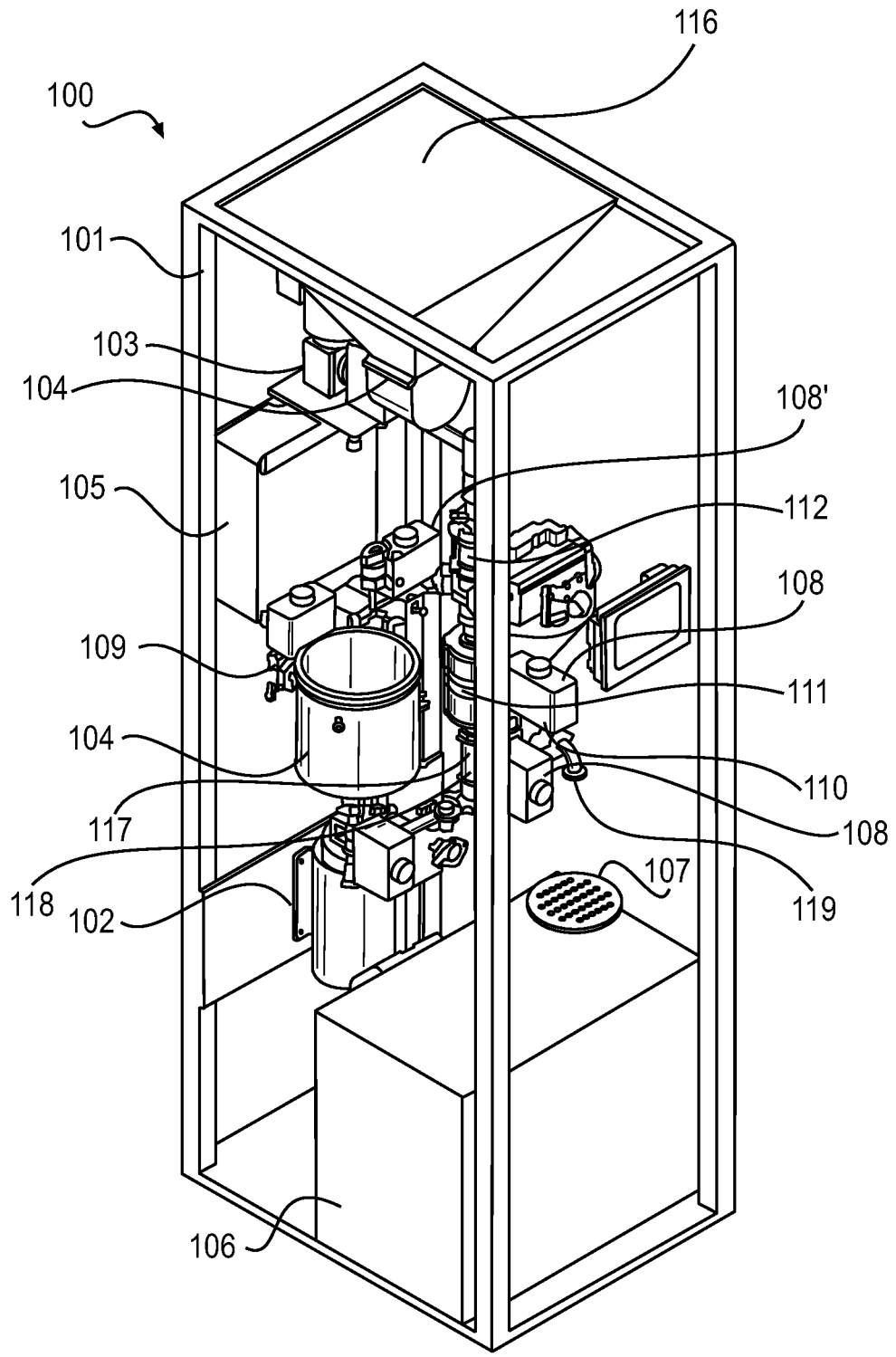
FIG. 1A is an exemplary perspective view of an apparatus according to some embodiments of the present disclosure.
Figure 1B:
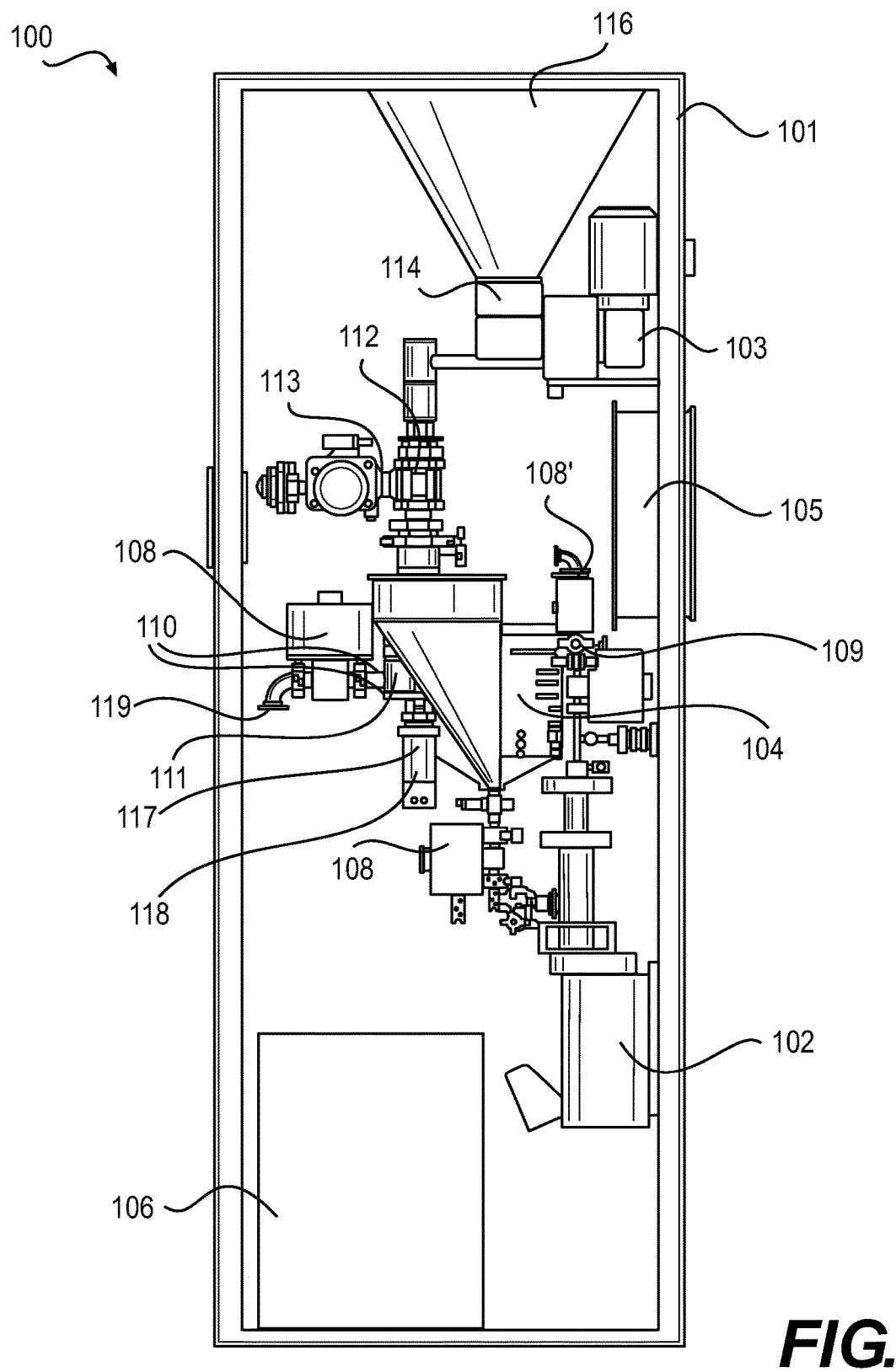
FIG. 1B is another exemplary perspective view of the apparatus shown in FIG. 1A.

FIG. 1A is an exemplary perspective view of an apparatus 100 according to embodiments of the present disclosure. FIG. 1B is an exemplary cross-section view of the apparatus shown in FIG. 1A. As seen in FIGS. 1A and 1B, the apparatus 100 has a square or rectangular cross-section. But the apparatus 100 is not limited to a rectangular shape. In other embodiments, for example, the apparatus 100 may have a cylindrical shape, or a shape that is neither rectangular or cylindrical.

By way of example, the apparatus 100 includes a housing 101 for framing and enclosing interior components of the apparatus. The apparatus also includes a hopper 116, which holds dry, shelf-stable ingredient or ingredients (e.g., ground soy, ground almonds, ground cashews, protein powder). For plant-based dry ingredient, the particles in the hopper remain large enough to prevent oils from being released and forming pasty butter. More than one hopper may be used in the apparatus, and different types of dry ingredients may be stored in each hopper (e.g., one hopper can be used to store almond meal, and another can be used to store maple sugar). In one exemplary embodiment, for example, the dry ingredients in each hopper can be released and mixed together.

The apparatus also includes a volumetric doser 114 for releasing a specified quantity of dry-ingredient powder (from the hopper 116) into water through a splash-back prevention unit 112. The doser 114 may rely on gravity to discharge the dry-ingredients. A feeder 103 may be used to ensure that the correct proportion or amount of dry ingredient is released by the doser 114 into the splash-back prevention unit 112. In one embodiment, the feeder 103 uses a corkscrew. In this embodiment, the volumetric amount of dry ingredient released into the water through the splash-back prevention unit 112 depends on the number of corkscrew rotations.

The splash-back prevention unit 112 may work in conjunction with water inlet 113 to mix the portion of dry ingredient dosed from the hopper with water to form a slurry. For example, water may be introduced into the apparatus through water inlet 113, and this water may come from chiller 106. The splash-back prevention unit 112 may use a circular waterfall whereby the dosed dry ingredients are dropped into the center of the circular waterfall to begin forming the slurry. In accordance with some embodiments, there may be no splash back of the dry-ingredient, the water, or the slurry back towards the hopper 116. This may help, among other things, eliminate the risk of clogs and clumps of residue, which may lead to inefficiencies in the apparatus and the growth of bacteria. Accordingly, splash-back prevention unit 112 may help enable the apparatus to have a completely sanitary solution. In accordance with some embodiments, because of the splash-back prevention unit 112, the entirety of the dry ingredient portion that is dosed from the hopper 116 may be mixed with the water and used in the final beverage that is output. In some embodiments, none of the dry ingredient portion that is dosed may remain in the apparatus.

As illustrated in FIGS. 1A, 1B, 2A, 2B, 3A, and 3B, a mixer/mill 11 may be operatively connected to the splash-back prevention unit 112. The mixture of dry ingredient dosed into the splash-back prevention unit 112 may eventually proceed to the mixer/mill 111. The mixer/mill 111 is part of a milling system that may grind the particles in the slurry into even smaller particles. At this point, for example, oils may begin to release from the particles in the slurry, but the solution may be immediately homogenized by the milling system (which includes the mixer/mill 111).

Figure 2A:
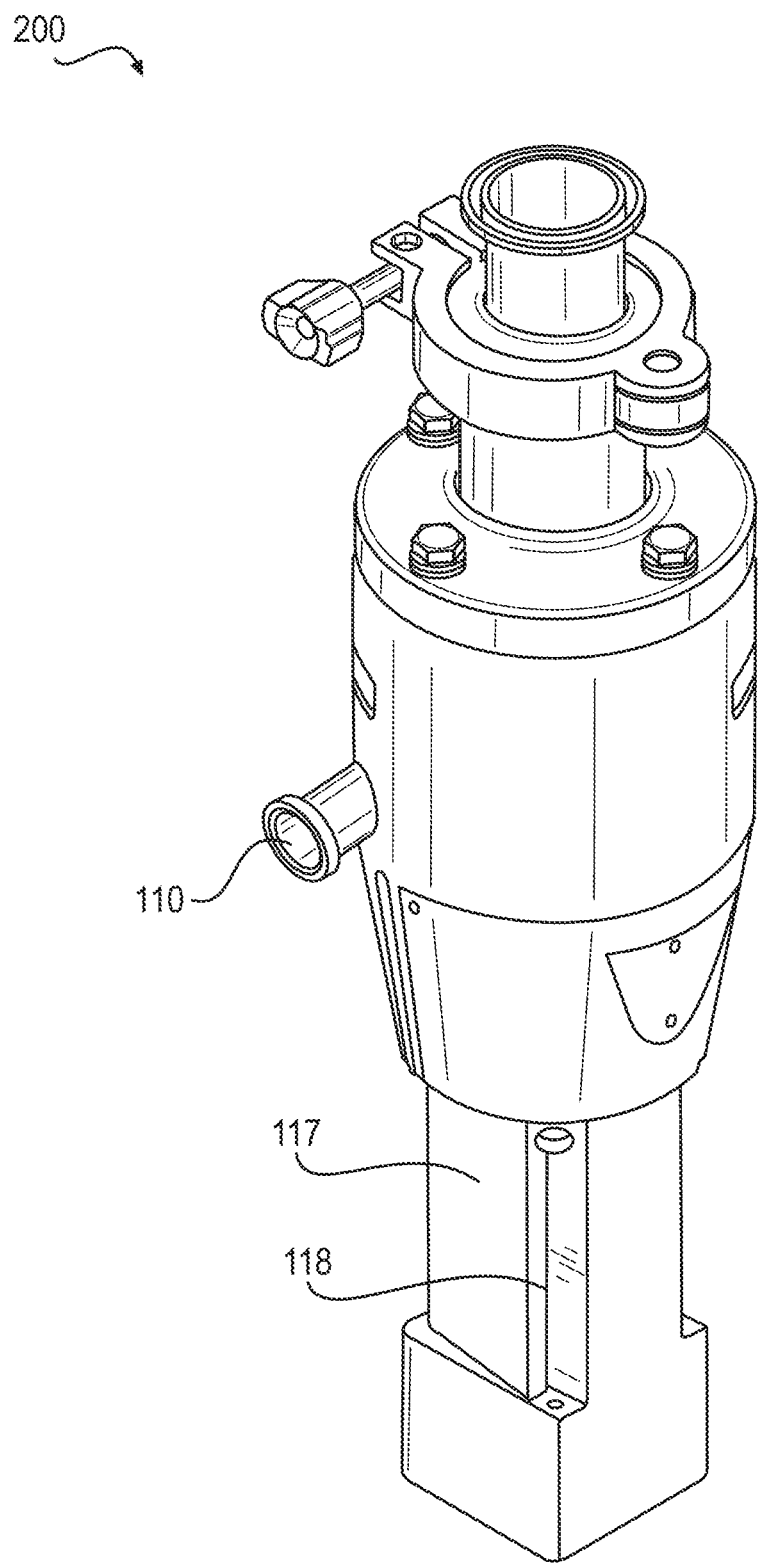
FIG. 2A is an exemplary perspective view of a milling system according to some embodiments of the present disclosure.
Figure 2B:
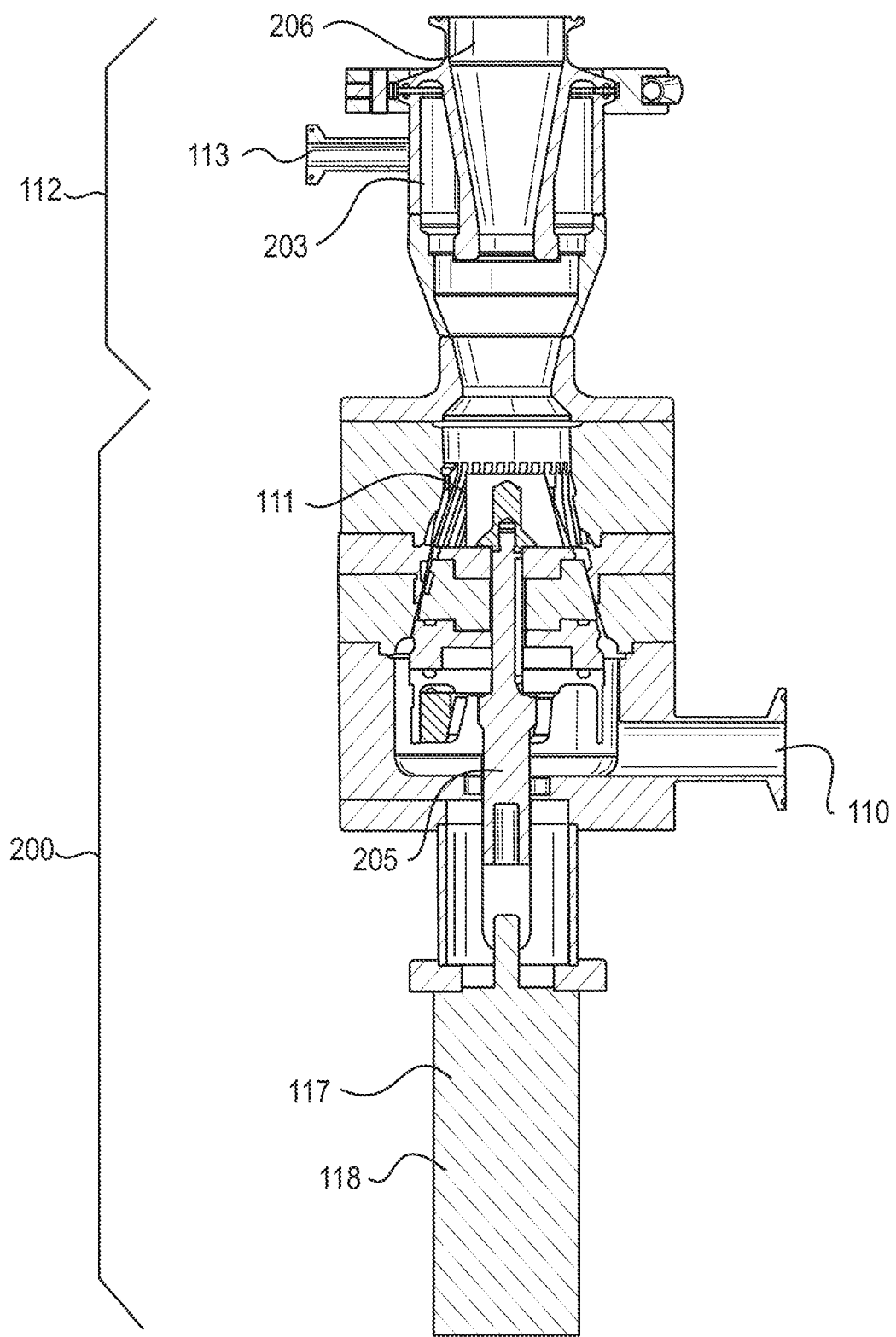
FIG. 2B is an exemplary cross-section view of the milling system (shown in FIG. 2A) and a splash-back prevention unit shown in FIGS. 1A-1B.

FIG. 2A is an exemplary perspective view of this milling system according to embodiments of the present disclosure. FIG. 2B is an exemplary cross-section view of the milling system of apparatus 200 shown in FIG. 2A, beneath the splash-back prevention unit 112. By way of example and as seen in FIG. 2B, the apparatus may include a dry-ingredient inlet 206 for introducing the dry ingredients and a water inlet 113 that allows for passage of water into the reservoir 203 of the splash-back prevention unit 112 of FIGS. 1A and 1B. The mixer/mill 111 may, for example, be used for homogenizing the slurry that enters the mixer from the splash-back prevention unit 112.

In accordance with some embodiments, the mixer/mill 111 may be a rotor-stator homogenizer, a shear pump mixer, or other similar mixer. The system 200 may further include a drive shaft 205 (used to torque and rotate the mixer), a motor 117 (used to control the milling system with linear or rotational force), a driver 118 (used to harness and control the electricity sent to the motor 117 and to control the speed and torque of the motor 117). The apparatus may also include a mixture outlet 110, through which the homogenized beverage may travel to the beverage outlet 119, upon where the beverage may be dispensed to a user.

Figure 3A:
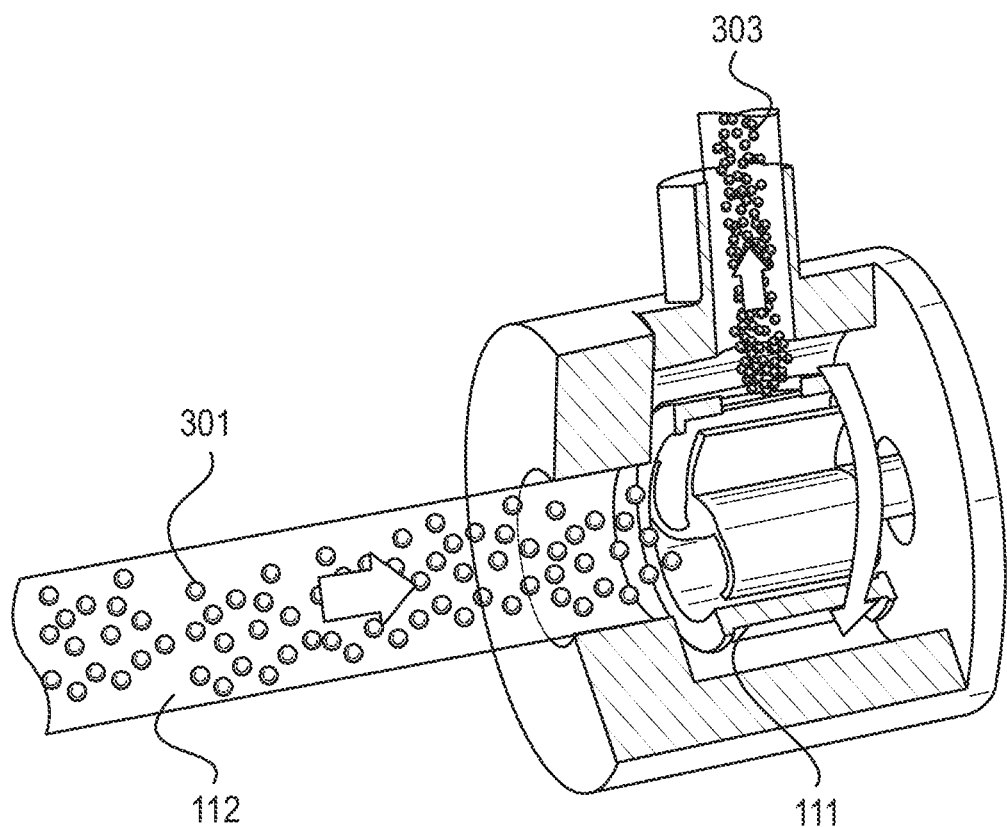
FIG. 3A is an exemplary perspective view of a mixer/cold miller according to some embodiments of the present disclosure.

FIG. 3A is an exemplary perspective view of mixer/mill 111 according to some embodiments of the present disclosure. As depicted in FIG. 3A, a slurry 301 may include a mixture of dry ingredient, which can be, for example, large particle coarse ground nuts, and water. The slurry 301 forms when the dry ingredient is added to the splash-back prevention unit 112. This slurry then travels through the splash-back prevention unit 112. Several shears spinning in mixer/mill 111 break up the particles in slurry 301 into even smaller particles to create a homogenous liquid 303.

Figure 3B:
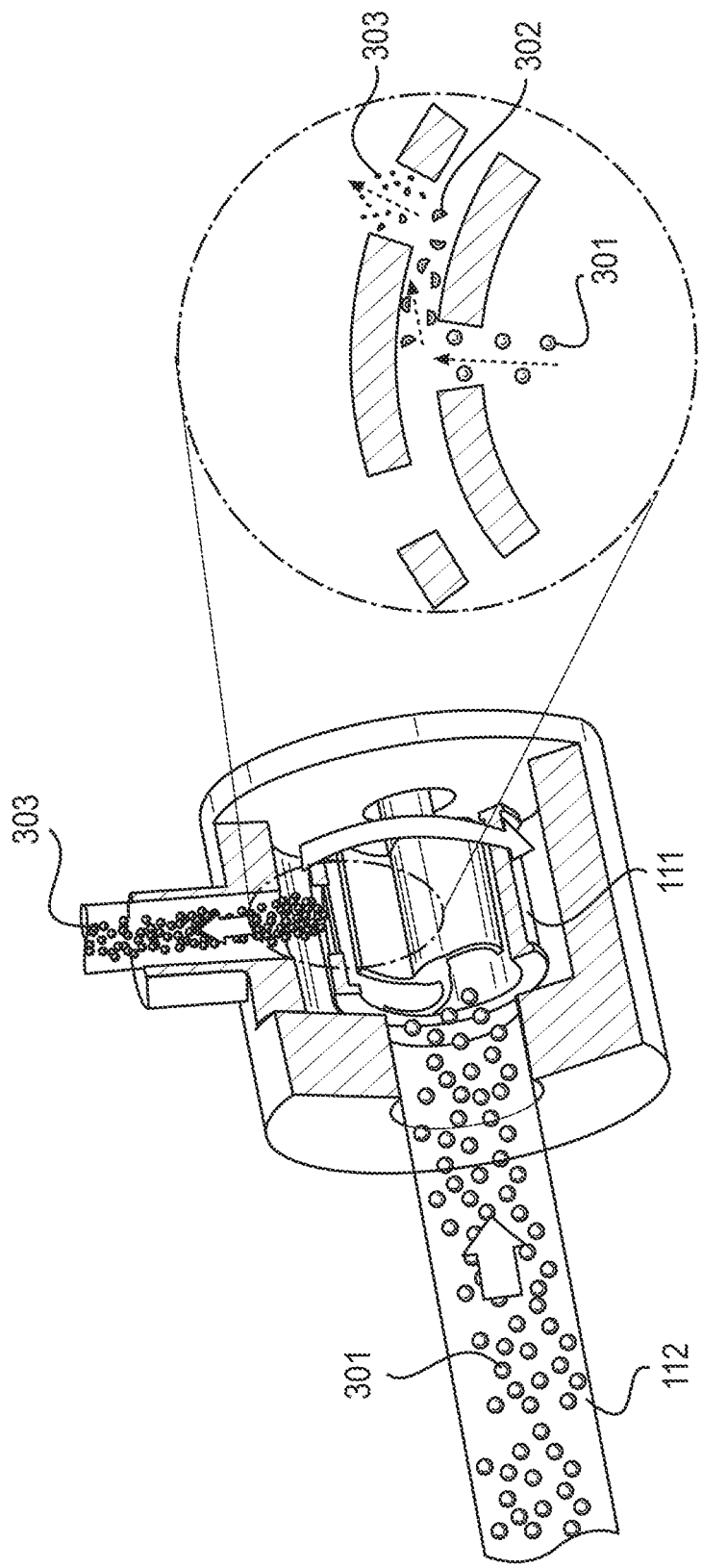
FIG. 3B is an exemplary detailed view of the mixer/cold miller depicted in FIG. 3A.

FIG. 3B is an exemplary detailed view of the mixer/mill apparatus 111 in FIG. 3A showing a magnified section view of the milling process for an input slurry (e.g., mixture of water and dry ingredient such as large particle coarse ground nuts), which is transformed into an output stream of finely ground particles emulsified in the water for a homogenous beverage (e.g., nut milk). As depicted in FIG. 3B, upon entering the mixer/mill 111, the slurry 301 may be introduced by pump 102 of FIGS. 1A and 1B to several different shears within mixer/cold miller 111, which spin and break up the particles at a continuous flow to create sheared slurry 302 and ultimately homogenous liquid 303. Pump 102 may be an electrical pump, pneumatic pump, or other suitable pump.

In accordance with at least some embodiments, the disclosed apparatus may perform a process of mechanically grinding particles to reduce particle size, along with simultaneously mixing in a liquid to achieve emulsification of the solid particles into the liquid. The constantly moving water may help prevent, for example, agglomeration of the nut particles while they are being ground fine enough to be suspended in the water. The moving water may also disperse and homogenize the nut oil to prevent solidification into nut butter.

As shown in FIGS. 1A and 1B, the disclosed apparatus includes a pump 102 for moving water, slurry, and homogenized mixtures through the system. The pump 102 may also be used to move water or sanitation fluid through the tubing of the system for cleaning purposes. Sanitation fluid may be contained in reservoir 104. By way of example, in some embodiments, the apparatus 100 may cycle sanitation fluid by pump 102 two times daily to clean out tubing in the apparatus. The disclosed apparatus may also incorporate electrical controls 105 for controlling operation of the apparatus, a chiller 106 for cooling water, and a drain 107 for collecting spills and used sanitizer fluid.

In accordance with at least some embodiments, the chiller 106 (as shown in FIGS. 1A and 1B) may cool the water and dispense a predetermined amount of the chilled water (optionally selectable by the user). In some embodiments, water may be directed to chiller 106 by a hard line hookup of water to existing plumbing. In other embodiments, water may be re-filled in chiller 106 or in a reservoir connected to chiller 106.

In accordance with at least some embodiments, the proportionality of water and pre-ground dry-ingredient used to create the slurry is important for optimal results during and after emulsification. The feeder 103 controls the amount of dry ingredient released from the hopper 116 or hoppers into the splash-back prevention unit 112. The amount of dry ingredient released may be automated and controlled by a system that operates with the feeder 103. The control system can be programmed to determine the correct amount of dry ingredient to be released for the particular liquid volume of the drink requested, for example.

According to some embodiments, the apparatus may measure water by using a flow meter (or a water quantity measuring dispenser 108') and dispense the correct proportion or amount of water. This dispensed water may be used to create the slurry 301 (as shown in FIGS. 3A and 38). The apparatus 100 may also include control valves 108 for controlling fluid flow by varying the size of the flow passage as directed by a signal from a controller or driver 118, and a pressure sensor 109 for measuring pressure of fluids, fluid flow, speed, or water level. This may allow the disclosed apparatus to, among other things, dispense the correct proportion of water for the particular beverage order. The elements described in this paragraph (e.g., the control valves 108, driver 118, and pressure sensor 109) may all be part of an automated system. In sum, in accordance with some embodiments in accordance with the present disclosure, the apparatus uses an automated control system to dispense the correct portions of dry ingredient and water into the apparatus for the particular drink requested.

In some embodiments, the amount of dry ingredient dispensed by the doser into splash-back prevention unit 112, and the mixer/mill 111 may dictate the thickness of the beverage output to the user. The dry ingredient proportion can range, for example, between 3% and 30% of the dry ingredient/water slurry. A dry ingredient amount that is 3% of the dry ingredient/water slurry may produce a beverage similar to skim milk. A dry ingredient amount that is 30% of the dry ingredient/water slurry may produce a beverage that is similar to heavy cream. A dry ingredient amount percentage that is somewhere in the middle may produce a beverage similar to whole milk. These percentages represent estimated limits in a spectrum. The thickness of the beverage increases as the percentage of dry ingredient increases from 3% to 30% of the dry ingredient/water slurry, for example. The volumetric ranges of the beverages output to the user under the disclosed apparatus can range, but are not limited to, 8 ounces to 128 ounces. Below is a table showing examples of ratios under various embodiments in accordance with the present disclosure.

TABLE 1

| 3% dry ingredients (oz) | 30% dry ingredients (oz) | Water (oz) |
|---|---|---|
| 0.24 | 2.4 | 8 |
| 0.48 | 4.8 | 16 |
| 0.96 | 9.6 | 32 |
| 1.92 | 19.2 | 64 |
| 3.84 | 38.4 | 128 |

In some embodiments, the apparatus may store pre-ground powder from dry ingredients (e.g., coarse ground cashew, ground vanilla bean, sea salt, dehydrated ground dates, etc.) in a disposable vessel that can be replaced, stored in bulk in the apparatus, or by adding a single serving amount each time used. The pre-ground dry ingredients used in the disclosed apparatus may be large enough in size to keep shelf stable. As explained above, if nuts, such as almonds or cashews, are ground too fine, they will turn into perishable nut butter from nut oils being released.

This presents a problem for making beverages, however, because if the dry ingredient particles stored in hopper 116 are too large, they cannot be emulsified. As described above, the disclosed apparatus solves this problem by using a milling system that further breaks the particles apart and allows for emulsification and homogenization in water.

The apparatus may dispense the resulting fresh beverage, or homogenous liquid 303, that is a clean ingredient, avoiding all the additives that are present in commercial product. In some embodiments, the apparatus may dispense water for the first 5 seconds, the beverage for the following 10 seconds, and water for the remaining 5 seconds to flush out the tubing of the apparatus.

In accordance with some additional embodiments, the apparatus may directly emulsify dry nut meal in water to produce a single serving of nut milk on-demand. The apparatus may, for example, automate the measurement of the dry ingredient and water quantities, combine the ingredients with the water to create the slurry, process the slurry, and then pour the beverage out into a container such as a cup.

In some embodiments the apparatus and method for producing a single serving beverage may provide a consumer with a single serving at the consumer's home or another suitable venue such as a grocery store, gym, hotel, hospital, or airport. For example, the disclosed apparatus could be used as a small home or personal use unit, or for on-demand single serving provision in a commercial application such as, for example, large format retail where consumers would be able to purchase nut milk "on tap."

In some embodiments, the apparatus and method may yield almond milk, cashew milk, pecan milk, pistachio milk, or various other combinations of nut, seed, or plant-based milk. In some embodiments, the apparatus may include settings such as Skim Nut Milk, Whole Nut Milk, or Nut Heavy Cream.

The apparatus may include, for example, a timer, a display, controls for starting and stopping the method of producing the single serving of the beverage, controls for selecting options such as quantity, a dispensing nozzle, and appropriate reservoirs and pumps.

Figure 4:
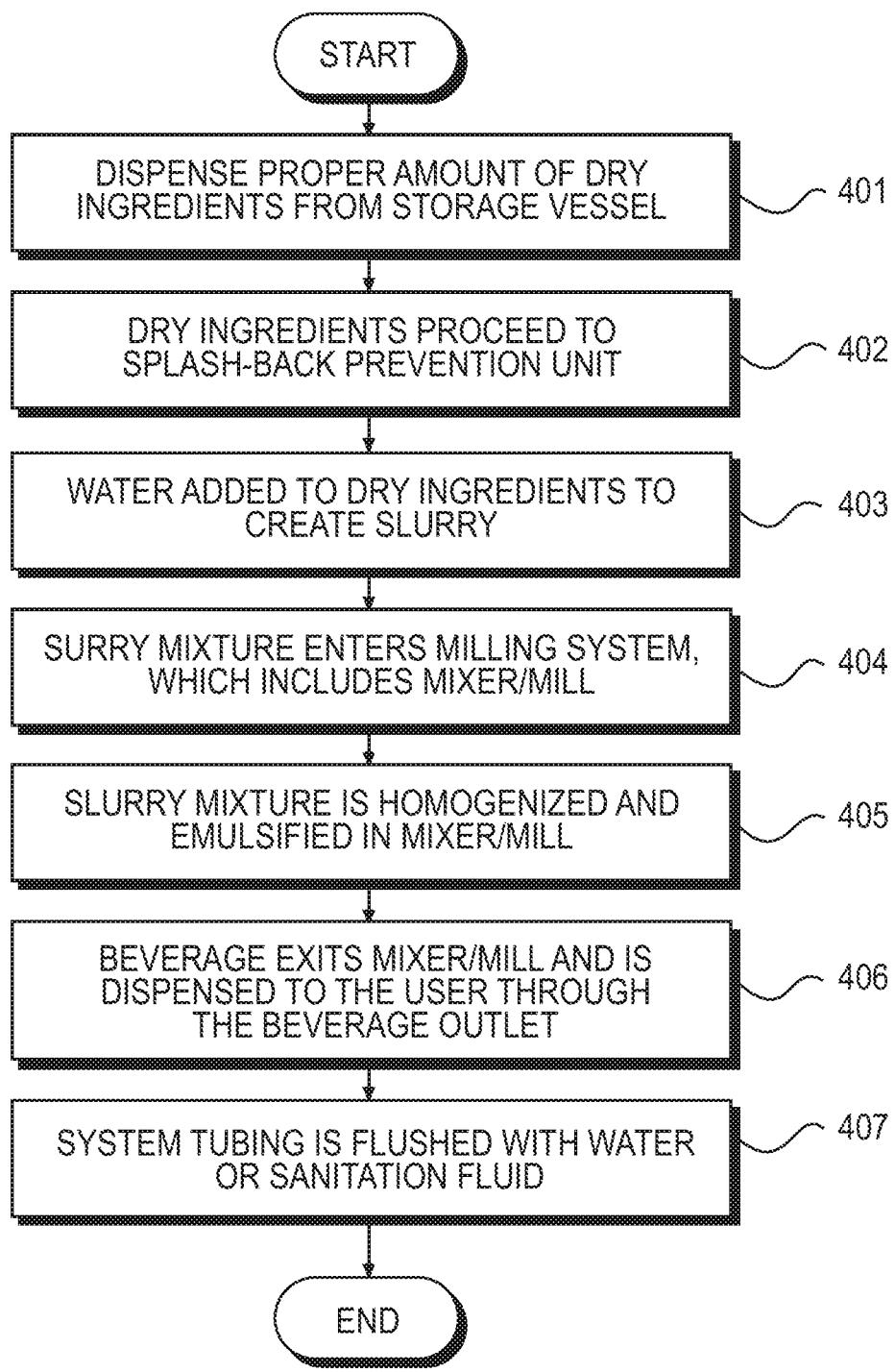
FIG. 4 is a flowchart of a method for mixing dry ingredients with water to produce a homogenous beverage, according to some embodiments in accordance with the present disclosure.

Referring to FIG. 4, a method for producing nut milk will now be discussed. As shown in FIG. 4, in accordance with some embodiments according to the present disclosure, the method may include the steps of retrieving water from a water supply, retrieving dry ingredient from a dry ingredient container, adding the dry ingredient to the water, preventing splash back with a splash-back prevention unit, and emulsifying and homogenizing a slurry mixture of dry ingredient and water by using a mixer/mill. Before emulsification, the slurry may consist of large particle coarse ground nuts and water. The method may also include moving slurry and homogenized liquid through a tubing system by using pump and controlling the mixer/mill with a motor.

According to some additional embodiments, the dry ingredient container includes one of a disposable single serving or a re-fillable container. The method may also include measuring dry ingredient with a dry ingredient measuring feeder.

In accordance with at least some embodiments in accordance with the present disclosure, the method may further include measuring water with the water quantity measuring dispenser 108'. In some embodiments, the water supply may be one of a re-fillable water reservoir or a water line hookup. The water in the slurry may be one of chilled or not chilled, in some other embodiments, and the pump may cycle sanitation fluid for cleaning. The pump may also cycle water for cleaning.

In accordance with at least some embodiments of the method in accordance with the present disclosure, the splash-back prevention unit may stop water, dry ingredient, and slurry from splashing back into the dry ingredient container. In various embodiments, the apparatus provides consumers with a convenient and affordable way to make a plant-based beverage with non-perishable ingredients. In accordance with one embodiment, the apparatus may product a single serving of a homogenized beverage, such as nut milk.

In some embodiments, the pre-ground dry ingredient is stored in either a disposable vessel (that can be replaced), stored in bulk amount in apparatus, or added in a single serving amount each time used. The dry ingredient from the storage vessel (e.g., hopper 116) is added to water, which may be cooled before mixing. In one embodiment, the dry ingredient is added to water through the splash-back prevention unit 112. The mixture of water and dry ingredients creates a slurry. If plant-based pre-ground dry ingredient was in the storage vessel, it may be too chunky for consumption. So the particles must be further broken apart and emulsified within the water. A homogenizer or shear pump mixer may be used for emulsifying. A fresh beverage may be dispensed, after which the apparatus may be cleaned by a water flush.

While illustrative embodiments have been described herein, the scope of any and all embodiments have equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed processes may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. An apparatus for producing a homogenous beverage, comprising:
   a water supply;
   a tubing system;
   a dry ingredient container configured to house at least one dry ingredient, wherein the at least one dry ingredient is pre-grounded;
   a splash-back prevention unit comprising an enclosure having a dry ingredient inlet and a liquid inlet, the dry ingredient inlet being disposed centrally with respect to the liquid inlet, wherein the dry ingredient container is connected to the dry ingredient inlet and configured to supply the at least one dry ingredient into the enclosure; the enclosure configured to receive the at least one dry ingredient and mix the at least one dry ingredient with a liquid received from the liquid inlet to create a slurry, wherein the splash-back prevention unit is configured to prevent movement of the at least one dry ingredient, the liquid, and the slurry from the splash-back prevention unit to the dry ingredient container, and wherein the liquid inlet is configured to create a circular waterfall flowing into the enclosure;
   a mill configured to convert the slurry to a homogenous liquid, by breaking up and mixing particles of the slurry;
   a pump configured to move the slurry, the liquid, and the homogenized liquid through the tubing system; and
   a motor configured to control the mill.

2. The apparatus of claim 1, wherein the dry ingredient container includes one of a disposable single serving or a re-fillable container.

3. The apparatus of claim 1, further comprising a dry ingredient measuring feeder, for measuring the at least one dry ingredient, wherein the feeder comprises a corkscrew, and wherein a volumetric amount of the dry ingredient depends on a number of corkscrew rotations.

4. The apparatus of claim 1, wherein the water supply is from one of a re-fillable water reservoir or a water line hookup.

5. The apparatus of claim 1, wherein the water in the slurry is one of chilled or not chilled.

6. The apparatus of claim 1, wherein the pump cycles sanitation fluid for cleaning the apparatus.

7. The apparatus of claim 1, wherein the pump cycles water for cleaning of the apparatus.

8. The apparatus of claim 1, wherein the motor includes a drive shaft for transmitting torque and rotation.

9. The apparatus of claim 1, wherein the at least one dry ingredient is at least one coarse dry ingredient.

10. The apparatus of claim 1, wherein the mill converts the at least one dry ingredient by reducing the particle size of the at least one dry ingredient.

* * * * *